US006868065B1

United States Patent
Kloth et al.

(10) Patent No.: US 6,868,065 B1
(45) Date of Patent: *Mar. 15, 2005

(54) METHOD AND APPARATUS FOR IMPLEMENTING A QUALITY OF SERVICE POLICY IN A DATA COMMUNICATIONS NETWORK

(75) Inventors: Raymond J. Kloth, Mountain View, CA (US); Thomas J. Edsall, Cupertino, CA (US); Michael Fine, San Francisco, CA (US); Dinesh G. Dutt, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 10/391,683

(22) Filed: Mar. 18, 2003

Related U.S. Application Data (63) Continuation of application No. 09/213,105, filed on Dec. 18, 1998, now Pat. No. 6,643,260.

(51) Int. Cl.[7] .............. H04J 1/16; H04J 3/14; H04L 1/00; H04L 12/26; H04L 12/28
(52) U.S. Cl. .................. 370/236; 370/395.41; 370/412
(58) Field of Search ............................ 370/395.41, 229, 370/235–236, 395.3, 395.31, 395.4, 412, 235.1; 709/223, 226, 229, 238–239, 240, 242

(56) References Cited

U.S. PATENT DOCUMENTS

| | | | | |
|---|---|---|---|---|
| 5,313,579 A | * | 5/1994 | Chao .......................... 709/234 |
| 5,602,830 A | * | 2/1997 | Fichou et al. ................ 370/232 |
| 5,649,110 A | * | 7/1997 | Ben-Nun et al. ........... 370/351 |
| 5,828,653 A | * | 10/1998 | Goss ........................... 370/230 |
| 5,841,874 A | * | 11/1998 | Kempke et al. ............. 713/160 |
| 6,094,435 A | * | 7/2000 | Hoffman et al. ............ 370/414 |
| 6,104,700 A | * | 8/2000 | Haddock et al. ............ 370/235 |
| 6,122,252 A | * | 9/2000 | Aimoto et al. .............. 370/235 |
| 6,163,542 A | * | 12/2000 | Carr et al. ................... 370/399 |
| 6,335,932 B2 | * | 1/2002 | Kadambi et al. ............ 370/391 |
| 6,643,260 B1 | * | 11/2003 | Kloth et al. ................. 370/235 |

OTHER PUBLICATIONS

Cisco Delivers New Advanced Capabilities to the Lightstream 1010 Multiservice ATM Switch, Jan. 27, 1997. newsroom.cisco.com/dlls/prod_012797.html.*

* cited by examiner

*Primary Examiner*—Seema S. Rao
*Assistant Examiner*—Kevin C. Harper
(74) *Attorney, Agent, or Firm*—Thelen Reid & Priest LLP; Steven J. Robbins (57) ABSTRACT

A method and apparatus for implementing Quality of Service (QoS) policy in a data communications network. An active flow content addressable memory (CAM) contains entries of flow information for each active flow of packets passing through a given node of the data communications network. The CAM has associated with each entry a packet counter, a byte counter, a token bucket, and a contract value. Each flow is assigned one of a plurality of output queues and optionally at least one output threshold value. A token bucket algorithm is employed on each flow to determine whether packets from that flow exceed the contract value. Such packets may be dropped or optimally modified to reflect an alternate output queue and/or alternate threshold before being sent to the selected output queue for transmission from the node.

33 Claims, 7 Drawing Sheets

METHOD AND APPARATUS FOR IMPLEMENTING A QUALITY OF SERVICE POLICY IN A DATA COMMUNICATIONS NETWORK

CROSS REFERENCE TO RELATED APPLICATION

This application is a continuation application based on U.S. patent application Ser. No. 09/213,105, filed on Dec. 18, 1998 now U.S. Pat. No. 6,643,260.

BACKGROUND OF THE INVENTION

1. Field of the Invention

This invention relates to the field of data communications networks. More particularly, this invention relates to a method and apparatus for implementing a quality of service (QoS) policy in a data communications network so as to thereby prioritize network traffic into a plurality of service levels and provide preferential treatment of different classes of data traffic on the data communications network. A number of priority levels may be implemented in accordance with the invention.

2. Background

This invention relates to switched packet data communications networks. There are a number of different packet types which are used in modern switched packet data communications networks.

Figure 1A:
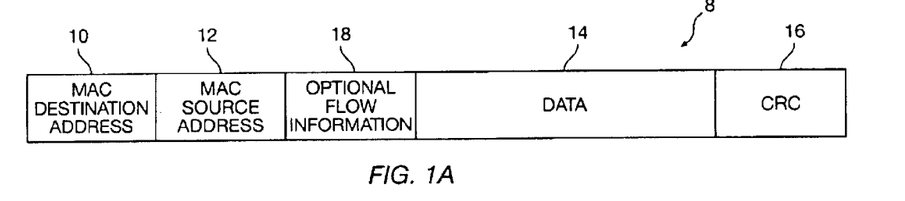
FIG. 1A is a diagram showing the structure of a typical Ethernet packet.

FIG. 1A depicts a generic packet 8 using Layer 2 encapsulation. A number of different Layer 2 encapsulation protocols are recognized. Each may include a MAC (media access control) destination address 10 and a MAC source address 12. The data 14 may include Layer 3 encapsulated packet information. A CRC (cyclic redundancy check) 16 may also be provided at the end of the Layer 2 encapsulation. The optional flow information block 18 may include an Ethernet type for Ethernet V 2.0 (ARPA) packets. The Ethernet type may include IPv4 (IP), IPX, AppleTalk, DEC Net, Vines IP/Vines Echo, XNS, ARP, or RARP. Other known encapsulations include SAP, SAP1, SNAP, and the like. The meaning of the bits in block 18 and to the size of block 18 differs among the different encapsulation protocols. This information is sometimes referred togas the Layer 2 Flow Information.

Figure 1B:
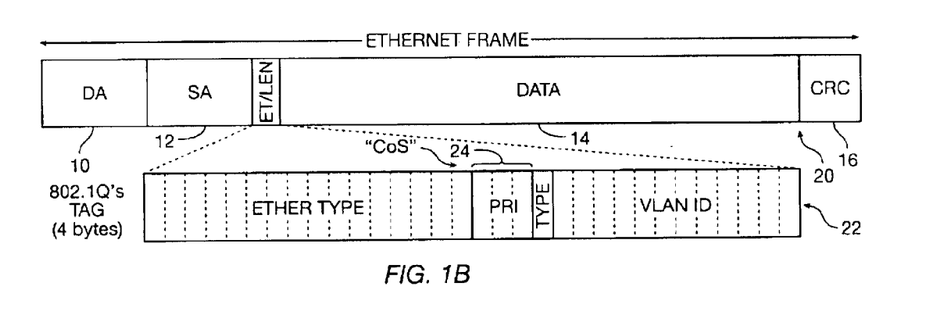
FIG. 1B is a diagram showing the structure of a typical Ethernet packet including the IEEE 802.1q tag.

One special case of Layer 2 encapsulation is the IEEE 802.1q frame shown schematically in FIG. 1B. The IEEE 802.1q frame (or packet) 20 has a MAC Destination Address ("DA") 10, a MAC Source Address ("SA") 12, a Data Portion 14, and a CRC 16. In addition, within block 18 is the IEEE 802.1q "tag" 22 which includes, among other items, a block of three priority ("PRI") bits 24. These three bits are also known as a "Class of Service" or "CoS" field.

Figure 1C:
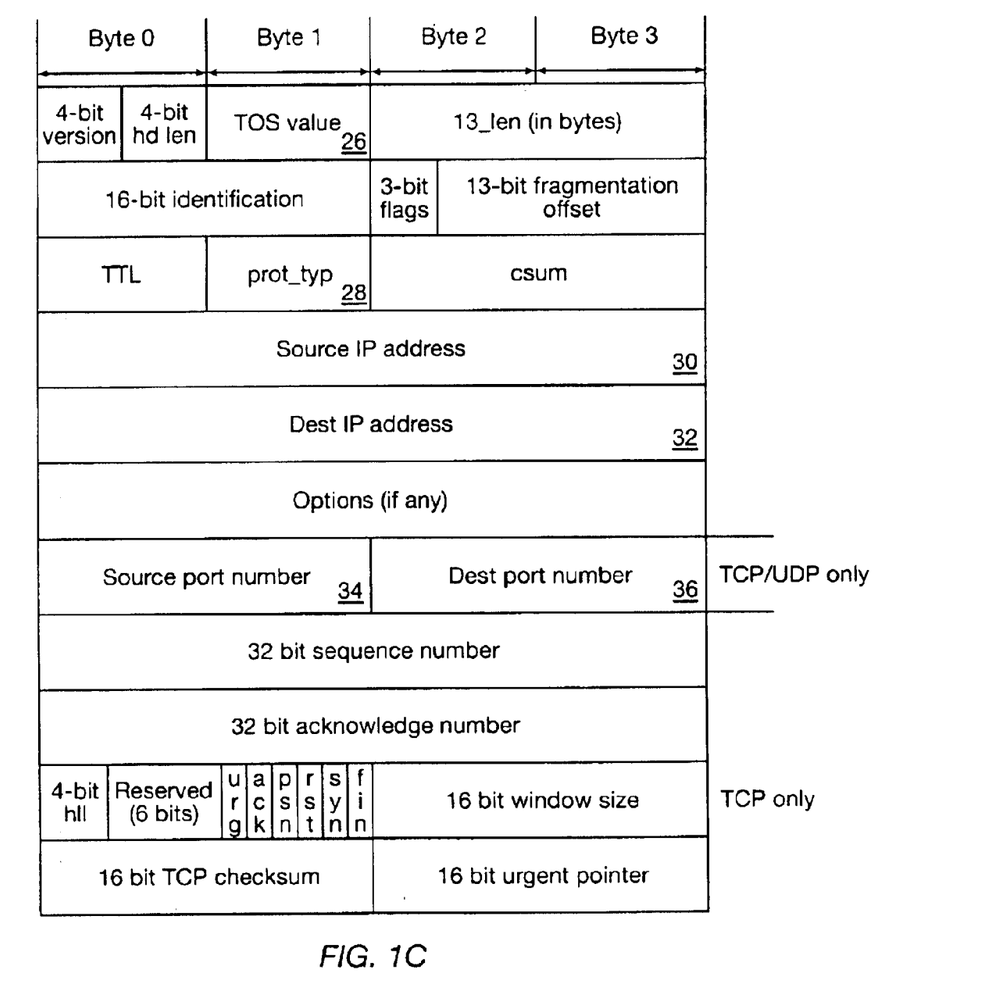
FIG. 1C is a diagram showing the structure of a Layer 3 EP packet.

FIG. 1C depicts the Layer 3 and Layer 4 structure of a typical IP packet. The IP packet format will be detailed here by way of example because it is presently one of the most common Layer 3 packet types. The fields of importance to this disclosure are the "ToS value" or type of service 26 which is a preferably an 8-bit field also known as the Differentiated Service ("DS") field, the "prot-typ" or IP protocol type 28 (typically either TCP (transmission control protocol) or UDP (user datagram protocol)), the Source IP address 30 (usually the IP address of the originating station), the Destination IP address 32 (usually the IP address of the ultimate destination station), the Layer 4 source port number 34 (available for TCP and UDP packets only), and the Layer 4 destination port number 36 (available for TCP and UDP packets only). The Layer 3 flow information includes the information before the source port number 34. The Layer 4 flow information includes the Source and Destination ports 34, 36. The Layer 4 flow information may be used to identify a particular packet flow as being the product of (source port) or directed to (destination port) a particular application. The ToS and CoS fields are used by routers of the data communications network to provide priority/delay/dropping services.

As the use of data communications networks increases worldwide, congestion of those networks has become a problem. A given data communications network, a given node on a data communications network, or a given link connecting two nodes has a certain capacity to pass data packets and that capacity cannot be exceeded. When data traffic on the data communications network becomes heavy enough that one can anticipate congestion problems, it is desirable to implement a "Quality of Service" or QoS policy so as to give priority to certain types of traffic and restrict the flow of other types of traffic, thus assuring that critical communications are able to pass through the data communications network, albeit at the expense of less critical communications.

One of the problems that network devices face in implementing quality of service solutions is in identifying and grouping transmissions to be given preferential treatment or to be restricted, that is, to prioritize the traffic in accordance with the Quality of Service policy established for the network. This becomes especially critical as bandwidth increases substantially over certain links while other links remain relatively slow resulting in traffic speed mismatches which, in turn, cause bottlenecks to data traffic over the relatively slow links. Such groupings must be consistently applied to traffic and must be applied at the rate that the traffic is passing without introducing additional delays or bottlenecks. Such groupings may be, for example, by protocol type, by destination IP address, by source IP address, by destination/source IP address pair, by source port and/or destination port (Layer 4), and the like.

Routers have, in the past, kept packet counts and rate limited packets in software, but router software has not scaled to the level of being able to process millions of packets per second through a node, providing the basic routing functions that they are required to provide and being able to also provide the rate limitation function.

One approach to identifying and grouping transmissions is for the host to categorize packets by use of the L2 CoS field, L3 ToS field, or both. The primary disadvantage of this approach is that it removes control from the system administrator and requires one to trust the end stations to the communication to properly implement the QoS policy. In some cases this trust cannot be justified. In addition, an end station only sees its own packets and therefore is unaware of the overall resource requirements within the data communications network and cannot make allowances for these requirements.

Accordingly, a Quality of Service policy controlled by a network system administrator is needed together with a mechanism for applying it at the full data rate of the data communications network.

SUMMARY OF THE INVENTION

In a first aspect of the invention, a content addressable memory (CAM or L3 Table) contains flow information for each active flow of packets passing through a given node of a data communications network. The CAM has associated with each entry (corresponding to each active flow) a packet counter, a number of bytes seen counter, a token bucket, and a contract value or committed access rate. Each flow is assigned one of a plurality of output queues and optionally at least one output queue threshold value. A token bucket algorithm is employed on each flow to determine whether packets from that flow exceed a committed access rate. Such packets may be dropped or optionally modified to reflect an alternate output queue and/or alternate output queue threshold value before being sent to the selected output queue for transmission from the node.

In a second aspect of the invention an access control list CAM (ACLCAM) contains masked flow information such as, for example, all or portions of IP source and/or destination addresses, protocol types, and the like. The ACLCAM provides single clock cycle accesses when performing lookups for each packet. The ACLCAM provides an N-bit index value in response to QoS lookups based upon the best match for the current packet.

The best match is order dependent for the entry in the ACLCAM and may represent any field in the packet upon which the administrator of the data communications network wishes to base traffic rate limiting and prioritizing decisions. A plurality of ACLCAM entries can yield the same N-bit index value. The N-bit ACLCAM index selects one of $2^N$ internal counters and associated preconfigured contract values, which become affected by the packet statistics. A token bucket algorithm is employed on these counters as discussed above.

The ACLCAM may also be used to determine the QoS parameters for new entries in the L3 Table as they are created. In addition, it is used to select an entry in the aggregate flow table described below.

In a third aspect of the invention, an aggregate flow table contains information specifying plural flows—for example all traffic between x and y regardless of type, all traffic to x of a certain type, all traffic from anyone of a certain type, and the like. These specifications may specify more than one flow. This is possible because each entry has a corresponding flow mask. This is different from the L3 Table which may identify certain specific flows only, i.e., all traffic of protocol type HTTP from x to y. Since the entire L3 Table operates with a single flow mask, each entry will have identical specificity, thus, there could be multiple entries for traffic from x to y if such traffic includes multiple protocol types and the flow mask does not mask the protocol type, for example.

In a fourth aspect of the invention, the CAM, an aggregate flow table, and the ACLCAM are combined in one system and used to produce, in parallel, a pair of traffic rate limiting and prioritizing decisions for each packet. The two results are then resolved (if in conflict) to yield a single result which is acted upon. The result is to modify or not modify the packet's CoS and/or ToS (or other) fields and to drop or pass the packet onto the next node of the data communications network.

DESCRIPTION OF THE PREFERRED EMBODIMENTS

Those of ordinary skill in the art will realize that the following description of the present invention is illustrative only and not intended to be in any way limiting. Other embodiments of the invention will readily suggest themselves to such skilled persons from an examination of the within disclosure.

In accordance with a presently preferred embodiment of the present invention, the components, process steps, and/or data structures are implemented using ASIC technology. This implementation is not intended to be limiting in any way. Different implementations may be used and may include various types of operating systems, computing platforms, and/or computer programs. In addition, those of ordinary skill in the art will readily recognize that devices of a more general purpose nature, such as hardwired devices, devices relying on FPGA technology, and the like, may also be used without departing from the scope and spirit of the inventive concepts disclosed herewith.

Introduction

Unless data communications networks are provisioned with large excess bandwidth, there may be times when the offered load at a given link will be greater than the capacity of that link. This results in greater than average packet delay or even dropping packets in excess of the link capacity. While this may be acceptable to many applications, it can effectively result in loss of service for others. Furthermore, user policies may dictate that some traffic is more important than other traffic and should, therefore, be given preferential treatment in these congestion situations. Even in non-congested conditions, it may be desirable to give preferential treatment to traffic with more stringent real time requirements (such as voice and video) so as to avoid the delay incurred waiting for the transmission of long packets with less stringent real time requirements.

Providing preferential forwarding treatment to some traffic, perhaps at the expense of other traffic, is referred to by the general term Quality of Service (QoS). QoS comprises four distinct functions. These are (1) Classification; (2) Rate Limitation; (3) Packet Rewrite; and (4) Scheduling.

Classification is the process by which a QoS label is assigned to a packet. The QoS label is represented by a codepoint used internally by the device which determines how the packet is treated as it flows through the device. A codepoint is an integer or other representation representing the QoS classification that the device assigned the packet to. The codepoint also determines the value written into the packet's CoS (for 802.1 q packets) and ToS (for IP packets) fields.

CoS means Class of Service. This is the name given to three bits in the Layer 2 header (CoS 24 in FIG. 1B) that indicate the QoS assigned to this packet. These three bits are located in the 802.1 q header for 802.1q-encoded packets and in the user field of the ISL (Inter-Switch Link) header for ISL-encapsulated packets. Those of skill in the art will realize that the present invention will work essentially interchangeably with 802.1 q-tagged frames and ISL frames as well as any other scheme including QoS encoding.

ToS means Type of Service. It is a preferably 1 byte (8-bit) field in the IP header (ToS 26 in FIG. 1C) that indicates the QoS assigned to an IP packet. Since the ToS field is not available for all packet types, the CoS field is also used. ToS is in the process of being redefined as "Differentiated Services" (DS). The ToS/DS field can select among up to 256 (2S) different queues, for example.

Input to the classification function includes user policies that map ACEs to codepoints. ACE means access control entry. It is a filter that is used to identify flows with certain characteristics. It includes fields such as device input and/or output ports, input and/or output VLANS, Layer 2 addresses, Layer 3 addresses, TCP/UDP (Layer 4) port numbers, and the like.

A committed access rate (CAR) is the bandwidth that a specific flow or group of flows will be limited to. The CAR can be enforced by rate limitation (dropping out-of-profile packets under certain levels of congestion in accordance with a selected algorithm) or by shaping.

The result of classification is a codepoint assigned (internal to the device) to the packet. (Depending on the user policies, it may simply be set to the CoS or ToS or other field initially taken from the packet).

There are three ways that user policy can control the classification of a packet.

1. By specifying the codepoint for a port (e.g., a particular hardware port of the device, a device input subnet, or a device input VLAN);
2. By specifying the codepoint for packets with a specific MAC destination address in a specific VLAN; and
3. By specifying the codepoint for packets matching a specific ACE.

In accordance with a presently preferred embodiment of the present invention, the algorithm for determining the codepoint of a packet consists of three distinct steps.

First, the packet is classified on the basis of the input port. If the port is a trunk port (carrying traffic from multiple VLANs) and the packet has an ISL or 802.1q header then the classification of the packet is the CoS of the packet. If the port is a trunk port and the packet does not have an ISL or 802.1q header, or the port is an access port (carrying traffic for a single VLAN), then the classification of the packet is set to the CoS value configured on that port. Each port is configured with a single CoS value.

Second, a check is made to see if a CoS has been explicitly configured for the packet's MAC destination address. If it has, then the packet is assigned the CoS configured for that address replacing the previously assigned CoS.

Third, a check is made to see if it matches any of the configured ACEs. If the packet matches a configured ACE, then the packet is assigned the CoS corresponding to that ACE, replacing the previously assigned value. Once a matching ACE is found, no others are checked. Thus, the order of the checking of the ACEs matters or a mechanism is required to resolve multiple matches.

Rate limitation or traffic restriction is the process by which the switch limits the bandwidth consumed by an individual flow or a group of flows counted together as an "aggregate". Rate limitation consists of two stages. The first stage determines if a given packet is in profile or out of profile. That is, whether or not the packet causes the flow (or aggregation of flows) to exceed its allotted bandwidth (CAR) or not. An "in profile" packet is a packet that does not cause the CAR of the packet's flow to be exceeded. An "out of profile" packet is the converse. The second stage of rate limitation assigns an action to apply to packets that are out of profile. This action may be either to reassign the packet a new codepoint or to drop the packet. Input to the rate limitation function includes: (1) user policies in terms of ACEs and QoS parameters; (2) device input port (or subnet or VLAN); (3) the codepoint the switch assigned to the packet; and (4) the packet flow including layers 2, 3, and 4. The output is a new codepoint, which may be either the original one or the new one, and a Boolean value to indicate whether or not to drop the packet. If the packet is dropped the new codepoint is irrelevant.

Packet rewrite is the process by which the device writes a new CoS 24 (for all IEEE 802.1q packets) and/or ToS 26 (for IP packets only) into the packet. These values are derived from the codepoint, preferably through a conventional mapping function. Input to the rewrite function is the packet's codepoint, the codepoint to CoS mapping, and the codepoint to ToS mapping. Other types of packets may employ packet rewrite such as ISL encapsulated packets and the like.

Depending on how the packet is classified, the rewrite function rewrites either the packet CoS 24 or both the CoS 24 and the IP ToS 26. If the packet is classified on the basis of an IP ACE, then both the CoS and the ToS are rewritten.

Note that for packets going out an access port or where the packet's VLAN is the native VLAN of a trunk port, the packet may be transmitted without an ISL or 802.1q header. In this case the CoS value is lost once the packet leaves the device. However, the CoS value is still used internally by the device in performing the scheduling function.

Scheduling includes the process by which the device picks an output queue for the packet, the policy for dropping packets when the queue exceeds some threshold (tail drop (dropping packets while the threshold is exceeded), RED (random early detection), etc.) and the algorithm for servicing the various queues (priority queueing, WRR (weighted round robin), etc.). Input to the scheduling function includes user policies that specify queue and scheduling configuration; user policies that map codepoints to queues; and the codepoint that was the output of the rate limitation function, i.e., the packet's current codepoint. The packet is enqueued on the appropriate queue or (perhaps randomly) dropped if the rate exceeds the CAR for this codepoint.

Figure 2:
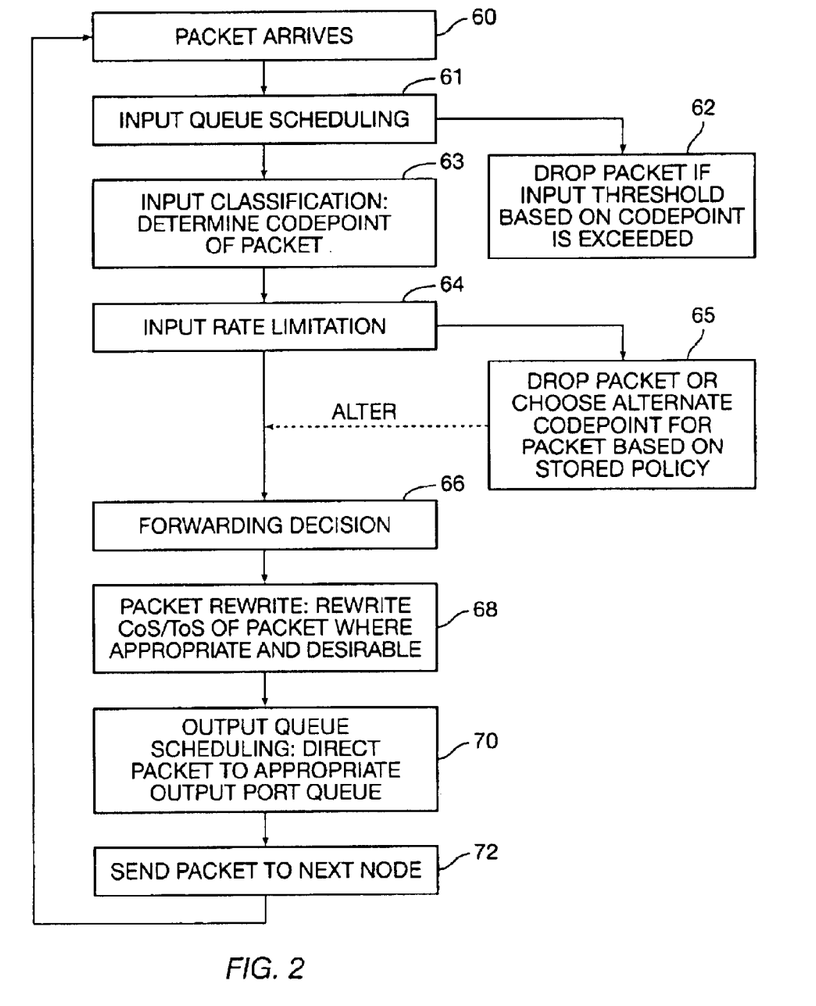
FIG. 2 is a block diagram showing the implementation of a Quality of Service policy.

The processing of the packet is diagrammed in FIG. 2. The first operation after arrival of the packet at block 60 is preferably an input queue scheduling process 61 where packets can be dropped (at reference numeral 62) at the input to the device under congestion conditions if an input threshold based upon the codepoint is exceeded. The next operation is preferably input classification 63 since it is not generally possible to do any of the other functions before the packet has been classified. In classification, the codepoint (from which may be derived the ToS and/or CoS) of the packet is determined. The codepoint is determined for all packets even if they are not packets which normally include ToS and/or CoS fields and these ToS/CoS values are used internally to the device.

Immediately after input classification is input rate limitation 64 where at block 65 the packet may be dropped or its codepoint altered based upon stored policies configurable by an administrator of the system. For example, if an out-of-profile packet arrives, then it may be dropped or its codepoint may be altered to make it more likely to be dropped down the line.

Following input rate limitation 64 is a forwarding decision 66. The forwarding decision 66 is not a part of the QoS, but it determines the output port of the device to use which, in this general model, is a parameter to the output queue scheduling process 70 discussed below.

Following this is the Packet Rewrite operation 68 where the CoS and/or ToS or other field of the packet is rewritten if appropriate and desirable.

Next, output queue scheduling 70 is performed and the packet is directed to an appropriate queue of the previously selected output port based upon the codepoint determined for the packet in the classification operation or the packet's subsequently altered codepoint. The threshold for the output queue is also selected here.

Finally, at 72 the packet is sent to the next node in the data communications network.

In an alternative embodiment, the device output port (or subnet or VLAN) could be a parameter to the classification function and, thus, a second classification function and a second rate limitation operation could be applied after the forwarding decision.

Figure 3:
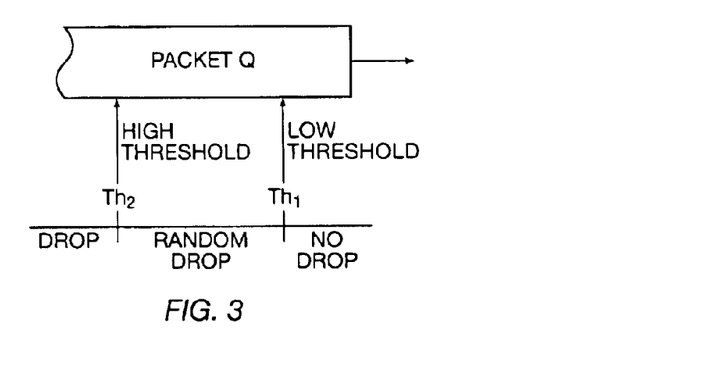
FIG. 3 is a diagram showing the functional operation of an output queue implementing threshold-based dropping.

Output scheduling depends upon the capabilities of the output port. Most prior art ports are FIFO (first in, first out) ports. Such ports are not capable of output scheduling in accordance with all aspects of the present invention. In accordance with one presently preferred embodiment of the present invention, an output port having two queues each with two configurable WRED (weighted random early detection) classes is used. WRED is well known to those of ordinary skill in the art. Each CoS is mapped as desired to one of those WRED classes. For each class there is preferably a low threshold $Th_1$ and a high threshold $Th_2$. The low value $Th_1$ specifies the average depth of the queue below which packets that map to that threshold's class will not be dropped. The high value $Th_2$ specifies the average queue depth above which packets will be dropped with probability 1. For average queue depths between the low and high values, packets are randomly dropped. This is shown in FIG. 3 for one class. It is possible to set the high and low values for each threshold to be the same or nearly the same. The result is a queue with four thresholds with tail drop or near tail drop performance when a threshold is hit. Tail drop means dropping all packets while the threshold is exceeded and no packets while the threshold is not exceeded.

In accordance with another presently preferred embodiment of the invention, packets are queued for transmission in one of a plurality of output queues. For example, two queues could be used, for example, a high priority queue and a low priority queue, or a voice queue and a data queue. Many queues could also be used to give more range to the priority processing of packets.

In accordance with a presently preferred embodiment of the invention, each queue has a fixed depth or memory capacity. Variable depth queues could be used as will be recognized by those of ordinary skill in the art. Each queue also has associated with it at least one threshold, the value of which is programmable.

As presently preferred, a WRED (weighted random early detection) algorithm may be used to determine the probability of dropping a packet based upon the state of fullness of its queue. For example, in a queue having two thresholds $Th_1$ and $Th_2$ (see FIG. 3) for $Th_2$ greater than or equal to $Th_1$, the more full the queue is, over a period of time and past a particular threshold such as $Th_1$, then the more likely a packet is to be dropped. The purpose here is to protect the higher priority traffic. Suppose that there is high priority traffic such as traffic used to control and regulate the operation of the communications network. If such traffic could not get through to its destination, then the network might fail. Thus it is desirable to set the threshold of other traffic so that it is dropped well before the time that the network becomes so congested that high priority traffic is at risk.

By selecting a relatively low value for $Th_1$ for the low priority queue, the low priority traffic in the low priority queue will be dropped well before high congestion is experienced on the data communications network. On the other hand, a much higher value for $Th_1$ is appropriate for mission critical frames—for example: do not drop until the queue is 100% full.

In effect, this system allows for certain high priority traffic to get through at the expense of other traffic in a device having multiple output queues and/or multiple thresholds rather than being subjected to a pure FIFO processing modality.

The output queue select (OPQSEL) value derived from the codepoint determines the queue selected for a multiple queue environment. For example, one might want to assign a relatively high priority to frames carrying voice information such as in IP telephony. This would minimize dropouts and pauses and make the conversation appear to be occurring essentially in real time without significant delays. Similarly, IP video frames might be handled in the same or a similar way. Alternatively, one might assign the high priority queue to users paying an additional fee to obtain the use of the high priority queue. Those of ordinary skill in the art will realize that many possibilities are capable of being implemented with the present invention.

Detailed Implementation

Content addressable memories ("CAMs") are well known to those of ordinary skill in the art. Such memories are typically a fixed number of bits wide and a fixed number of addresses long. For example, a CAM might be 80 bits wide by 8K (8192) addresses long. A binary CAM would include at each bit position a capability of comparing a data vector, say 80 bits long, against a programmed content of the particular address. In a binary CAM, the data vector would simply be compared binary bit for binary bit to the binary contents of the given address and a determination would be rendered as to whether a match existed or not. A ternary CAM or "TCAM" adds a capability of comparing its contents not only to a data vector having a 0 or a 1 at each bit position but also to a bit position having a wild card or "don't care" condition usually represented by an "x". Thus if a TCAM entry having a data vector {0, x} representing 0 in the left bit position and "don't care" in the right bit position is compared to an input data vector having the value {0,1} there will be a match. There will also be a match if the input data vector has the value {0,0}. However, the values {1,0} and {1,0} for the input data vector would both yield a no match condition. In certain types of addressing schemes, certain bits are more meaningful than other bits, thus this ability to have a "don't care" selection (in effect, to mask certain bits) can be very useful.

A method of using a TCAM (or CAM) is to take a data vector and test it sequentially against each address of the TCAM until a match is found, then to use the address of the match to index to a location in memory containing an appropriate response to the match condition. Another method is to apply the data vector essentially simultaneously to all addresses in the TCAM or CAM and to index off of a match, if any are found. In case of multiple matches, a method of resolving the multiple match is required. Preferably, the first match is used and the rest of the entries are ignored to provide priority to the first match. A match is always guaranteed in accordance with a presently preferred embodiment of the present invention by providing a default match for instance where no other match is found.

Every frame passing through the device is preferably checked simultaneously against two tables:
(1) an L3 table implemented using a netflow switching content addressable memory (CAM); and
(2) an aggregate table using an access control list CAM preferably implemented as a ternary CAM (TCAM).

The netflow switching CAM has associated with each entry (corresponding to each active flow) a packet counter, a number of bytes seen counter, a token bucket count, and a contract value in terms of rate and bucket size. A token bucket algorithm is employed on each flow to determine whether packets are in or out of profile and/or what threshold (OPQTH) to assign. All updates to the CAM are preferably done in hardware. The default OPQTH value can be overridden for solicited bandwidth reservations (e.g., RSVP flows) only.

The Access Control List CAM (ACL CAM) preferably provides single clock cycle accesses when performing a match check for each packet. This leaves plenty of bandwidth to perform an additional QoS lookup based upon the best match for the current packet. The best match is order dependent for the entry in the ACL CAM, and may represent any field in the packet upon which the administrator wishes to base rate limitation decisions. More than one CAM entry can produce the same n-bit CAM index. The n-bit CAM index selects one of $2^n$ internal hardware counters and associated preconfigured contract levels, which become affected by the packet statistics. The same or a similar token bucket algorithm applied in the netflow CAM counters is applied on these counters, allowing aggregation of traffic to be processed in parallel. The processing results from the netflow CAM and the aggregate counters are combined to produce a final new codepoint or drop decision for the current packet. Because this QoS approach is applied at the hardware level, it can run at the line rate of the system and avoid any effect on the overall switching performance of the system.

Potentially a match will be found in both tables (the L3 table and the aggregate table) based upon two independent match criteria. As pointed out above, the aggregate table will always produce a match with at least a default mask. Both tables maintain a last-seen timestamp and a token bucket. When a match occurs, the two independent bucket counts are examined to determine the frame's output queue (OPQSEL) and output queue threshold (OPQTH). If either bucket count exceeds a corresponding contract value, then two independent rate limitation decisions are made. Either of these decisions may result in dropping or changing the packet. Finally the two independent rate limitation decisions are resolved to produce the final rate limitation decision for the frame.

Token bucket algorithms are well known to those of ordinary skill in the art. The basic idea is to provide a method of averaging a value which may come in spurts, such as a data transmission. In accordance with a presently preferred embodiment of the present invention, a token bucket algorithm is implemented with a counter for each table entry in the aggregate table and the L3 table. The counter is incremented for each in-profile byte associated with the flow passing through the system. A minimum byte increment may be enforced for short packets. The counter is decremented by a fixed number (the "leak rate") associated with the passage of a given amount of time. The leak rate corresponds to a contract value. This has the effect that the value stored in the counter will not grow over time as long as the leak rate exceeds or equals the data throughput rate for the flow. However, where the data throughput rate exceeds the leak rate for a significant period of time, the counter value will grow.

In a presently preferred embodiment of the present invention, the actual computation of the value of the bucket count is made only when a flow hit occurs. Then the bucket count is decremented by the difference between the current time and the last seen time in time units multiplied by the leak rate (per time unit) and incremented by the number of bytes in the frame that had the flow bit.

Figure 4A:
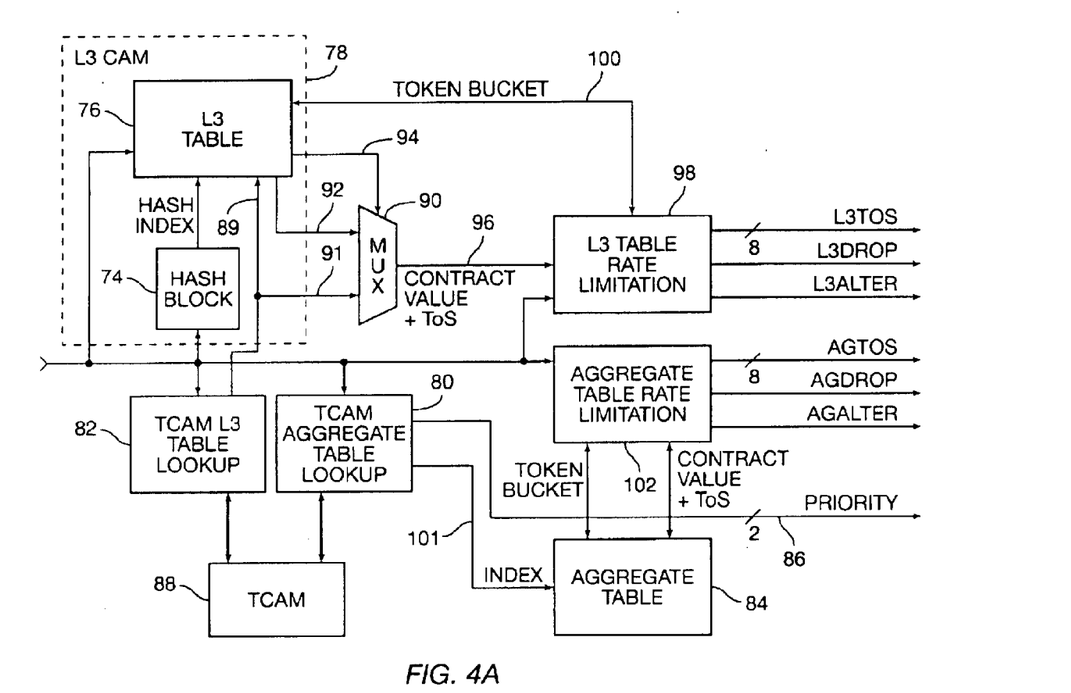
FIGS. 4A, 4B and 4C are a system block diagram of an apparatus in accordance with a presently preferred embodiment of the present invention.
Figure 4B:
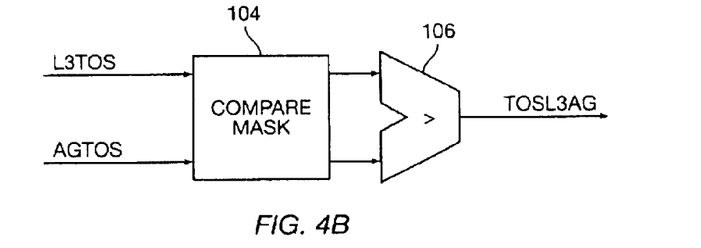
Figure 4C:
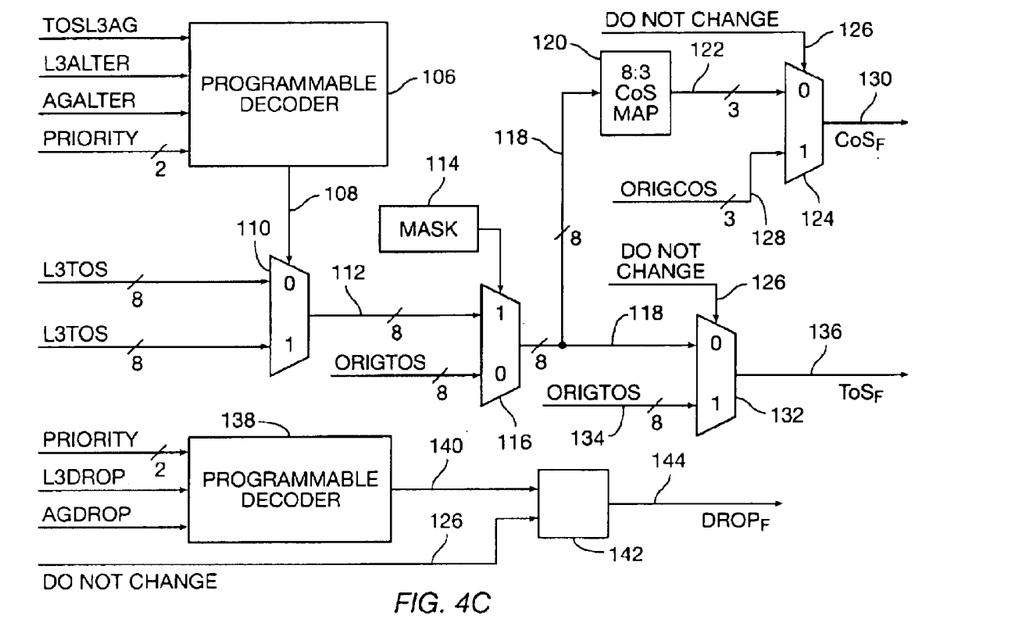

FIGS. 4A, 4B, and 4C are a block diagram of the apparatus for a quality of service policy in accordance with a presently preferred embodiment of the present invention.

Turning now to FIG. 4A, the packet enters on line 73. At hash block 74 a hash index is obtained in a conventional manner. The hash index is used to access the Layer 3 table (L3 Table) 76 which may preferably be implemented in RAM (random access memory). Hash block 74 together with L3 table 76 form L3 CAM 78. The packet's flow is compared to active flows existing in the L3 table 76. If a match is found, i.e., the packet is part of an active flow, then the statistics fields corresponding to the flow and stored in the L3 table 76 are accessed. If no match is found, then the L3 table 76 is updated to reflect the new flow. These statistics fields may include, for each active L3 flow, a packet counter, a number of bytes seen counter, a token bucket, and a contract value. If the flow is not an active flow, i.e., there is no entry corresponding to the packet's flow in the L3 Table, then a default is preferably used, Defaults may be set by the System Administrator.

The packet is also routed from line 73 to a pair of TCAM lookup operations. The first type of TCAM lookup 80 is an aggregate table lookup which provides an index to the Aggregate Table 84 and returns a two-bit priority code on line 86 for combining the two ToS values. For example, the 2-bit priority code can indicate how to handle conflicts, e.g., "use the lowest threshold of the two ToS values", or another scheme could be used as will now be clear to those of ordinary skill in the art.

The second type of TCAM lookup 82 is an L3 Table lookup. For each frame a TCAM L3 table lookup 82 is performed and provides the contract value and token bucket counter indirectly through an index that in a preferred embodiment selects 1 of 64 choices. When hardware creates an entry in the L3 table 76, it writes these parameters into the L3 table 76 over line 89. Later when a frame matches the entry, there are 2 sets of parameters provided:
(1) one set of parameters provided by the L3 Table lookup 82 into the TCAM; and
(2) a second set of parameters read from the L3 table 76.

The CAM or TCAM 88 will be logically separated into a Layer 3 Table QoS policy area and an Aggregate QoS policy area.

The data from the TCAM L3 Table lookup 82 is applied as an input to MUX 90 on line 91 as is the current data from the L3 table 76 on line 92.

A selection value on line 94 from the L3 Table 76 selects whether to use the parameters from the TCAM L3 Table lookup 82 or the parameters from the L3 table on line 92.

By default, the parameters coming from the TCAM L3 Table lookup 82 are used. The system can be told with software to use the parameters stored in the L3 Table 76 instead. This approach is desirable when the parameters have been modified by software intervention. The L3 Table parameters may be initially set by software prior to flow existence or overridden by software. The L3 Table 76 initially learns its parameters by performing TCAM L3 Table lookup 82 into the TCAM 88.

The selected information include the contract value and is applied over line 96 to the L3 table rate limitation block 98. A token bucket is operated as discussed above over line 100 with the L3 table 76. The outputs of L3 table rate limitation block 98 include "L3TOS", an 8-bit representation of the calculated ToS for the packet, "L3DROP", a value indicating whether or not to drop the packet based upon it being out of profile or not, and "L3ALTER", a one-bit value indicating whether or not to alter the codepoint of the packet.

The aggregate table side operates similarly. The bank of aggregate counters used for token bucket analysis is pre-configured with the codepoint and the token bucket parameters to use. The priority is not stored, allowing different policies to map to the same aggregate counter (several matches may map to the same aggregate counter index, with different priorities for resolving which ToS to use, depending upon the actual flow).

The TCAM aggregate table lookup 80 into TCAM 88 provides an index on line 101 used to access the Aggregate Table 84. The contract value and token bucket counter are used in aggregate table rate limitation 102 to produce "AGTOS", the ToS based upon the aggregate table processing branch 220 of FIG. 5A, "AGDROP", the dropping decision based upon branch 220, and "AGALTER", a one-bit value indicating whether or not to alter the codepoint of the packet.

The packet processing described herein is based upon the DS/ToS definition. If a valid ToS/CoS is not available, e.g., for a non-802.1q and non-IP packet, a working value is derived from other sources for internal use as discussed above. For legacy ToS definitions (i.e., the present ToS definition), the precedence bits from the ToS are mapped into DS/ToS values with a conventional mapping. For frames that are not IP, the 3 bit CoS field is mapped into an 8 bit ToS field with a conventional mapping. This approach is also applied if the DS/ToS field of an incoming IP frame is assumed to be invalid for some reason.

The ToS remap takes any input ToS and maps it to a final AGTOS or L3TOS. It is configured by software. The meaning of the various possible values of the 8-bit ToS may be set by software as desired.

Turning now to FIG. 4B, a method and apparatus for combining certain bits of L3TOS and AGTOS into a resulting one-bit "TOSL3AG" value in accordance with a presently preferred embodiment of the present invention is shown. A programmable compare mask 104 is used to mask bits which will not be used in the comparison. Then the two masked signals are applied to a comparing MUX 106—providing a one-bit indication of which value is larger.

Turning now to FIG. 4C, a method and apparatus for resolving L3TOS, L3DROP, L3ALTER, AGTOS, AGDROP, and AGALTER using the two-bit priority value "priority" from FIG. 4A is shown in accordance with a presently preferred embodiment of the present invention.

TOSL3AG, L3ALTER, AGALTER, and the two-bit priority value are applied to a programmable 5:1 decoder 106. Using a selected mechanism to resolve the various inputs (it would be as simple as "always choose L3TOS"), a bit on select line 108 to MUX 110 chooses L3TOS or AGTOS which is then provided on line 112. Optionally certain bits of the original ToS ("ORIGTOS") may be passed through and used to override the value on line 112 using bit mask 114 and MUX 116. The output of this process on line 118 is applied to 8:3 CoS Mapping 120 which results in a 3-bit output on line 122. This is in turn, optionally applied to MUX 124 where, if the "DO NOT CHANGE" signal 126 is asserted, the original CoS value "ORIGCOS" on line 128 is passed as COSF on line 130, otherwise the value of CoS on line 122 is passed as COSF on line 130.

Similarly, the calculated ToS on line 118 is applied to MUX 132 where, if the "DO NOT CHANGE" signal 126 is asserted, the original ToS value "ORIGTOS" on line 134 is passed as $TOS_F$ on line 136, otherwise the value of ToS on line 118 is passed as $TOS_F$ on line 136.

Finally, L3DROP and AGDROP are combined and resolved as follows. The two-bit priority value, L3DROP, and AGDROP are applied to a 4:1 programmable decoder 138 to obtain a dropping decision in accordance with a programmable policy. Preferably the priority value is used to select L3DROP or AGDROP. Other policies could also be programmed, such as, for example, "always use L3 DROP." The result is output on line 140. A device such as a programmable 2:1 encoder 142 combines the signal on line 140 with a "DO NOT CHANGE" signal on line 126 to yield a signal $DROP_F$ on line 144 which follows the signal on line 140 unless "DO NOT CHANGE" is asserted, whereupon the value of the signal on line 144 is set to "DO NOT DROP."

FIGS. 5A, 5B, 5C, and 5D are a flow chart detailing an implementation of a presently preferred embodiment of the present invention. At reference numeral 200 the process starts with the arrival of a packet at reference numeral 202 at a node of the communications network. For packets having a CoS field and/or a ToS field, this information is extracted at reference numeral 204. Optionally, at reference numeral 206 it is possible to bypass some or all of the packet processing if the packet came from a "trusted source", that is, one that is already implementing a similar process in accordance with the policy implemented by the network administrator. Where the packet comes from a trusted source (as can be detected by knowing the physical port of the device that it arrived on) then a full bypass or partial bypass can be implemented. In a full bypass, as at reference numeral 208, control is shifted to reference numeral 210 in FIG. 5D, discussed below. In a partial bypass, as at reference numeral 212, control is shifted to reference numeral 214 in FIG. 5B. This is also discussed below.

Figure 5A:
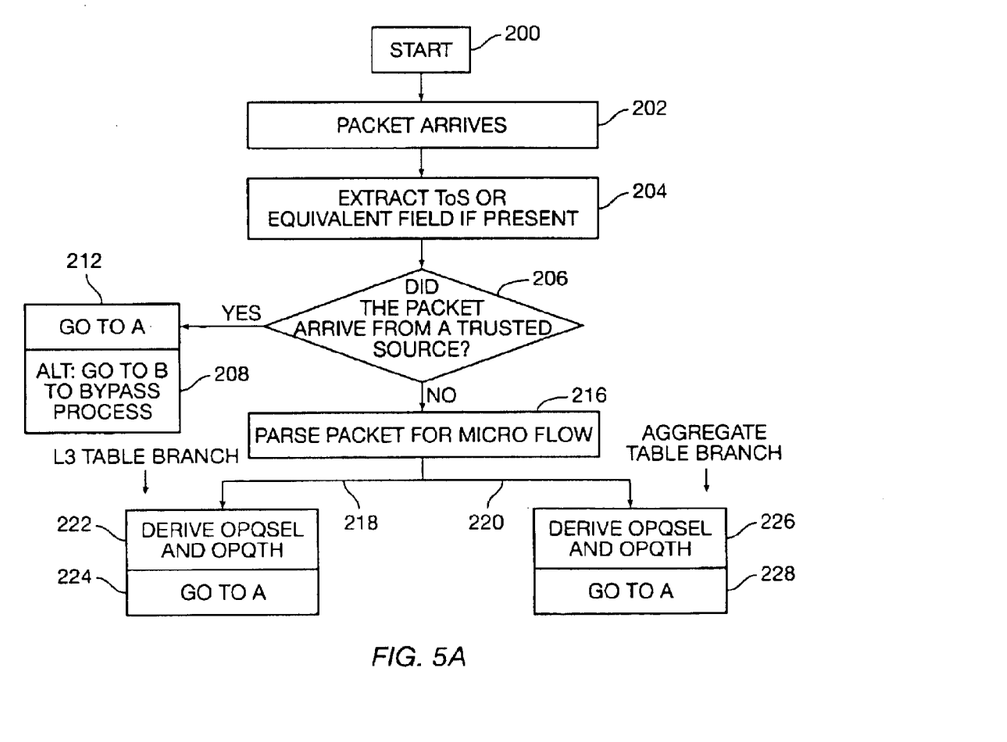
FIGS. 5A, 5B, 5C and 5D are a flow diagram of packet processing in accordance with a presently preferred embodiment of the present invention.

If the packet is not from a trusted source or if bypassing is not implemented, then control is passed to reference numeral 216 in FIG. 5A. At reference numeral 216 the packet is parsed for its micro flow. In this process, the pertinent part of the flow is extracted for use in accessing the CAMs associated with the Layer 3 Table and/or the Aggregate Table.

Now, in accordance with a presently preferred embodiment of the present invention, control passes in parallel along branches 218 and 220 proceeding from reference numeral 216. Branch 218 processes information using the Layer 3 Table approach discussed above. Branch 220 processes information using the ACL CAM/Aggregate Table approach discussed above. While it is preferred to do both in parallel, either can be used exclusively and is still within the inventive concepts disclosed herein.

Following branch 218, the micro flow is compared to the entries in the Layer 3 Table at reference number 222. The closest match will result in obtaining either directly, or through a pointer, the OPQSEL (output queue select) and OPQTH (output queue threshold) values for the micro flow (assuming that the micro flow has been seen recently and is therefore contained in the Layer 3 Table). In accordance with a presently preferred embodiment of the invention, the OPQSEL can be either 0 or 1 representing two output queues and the OPQTH can be 0, 1, 2, or 3 representing four levels of threshold. The three-bit CoS value is simply the OPQSEL bit and the two OPQTH bits. This value is sent to the port to control output queue selection and threshold. Control is then transferred at 224 to reference numeral 214 of FIG. 5B.

Similarly, following branch 220, the micro flow is masked at reference numeral 226 and compared to the entries in the ACLCAM/Aggregate Table. Preferably, the first match is reported and an OPQSEL and OPQTH value derived there from. At reference numeral 228, control is transferred to reference numeral 214 of FIG. 5B.

Figure 5B:
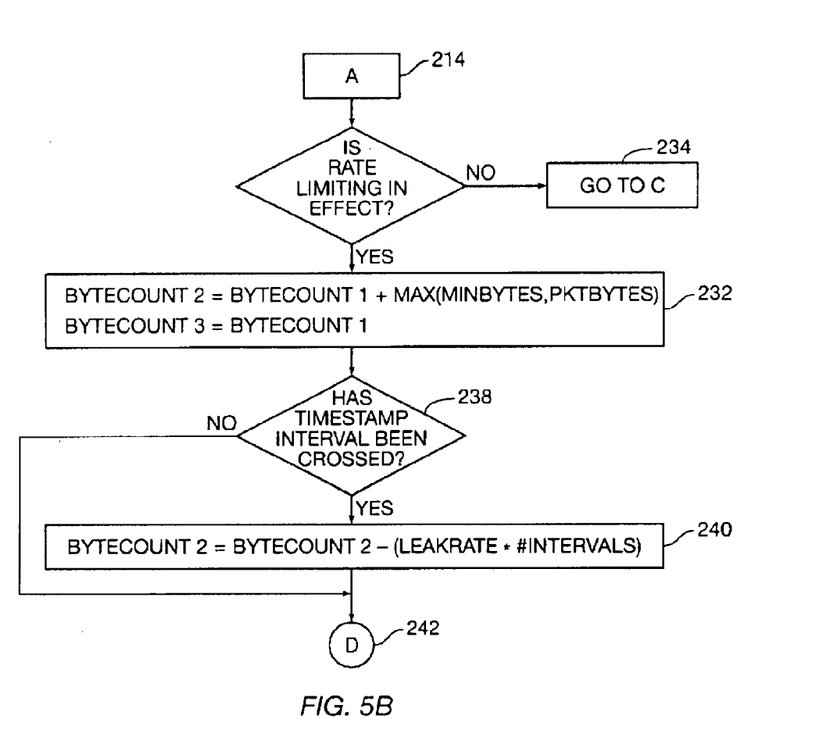

The process starting at reference numeral 214 is performed for both branch 218 and branch 220 separately.

If the policy is so set that rate limiting is in effect, then at reference numeral 230, control transfers to the token bucket process starting at reference numeral 232. Otherwise, at reference numeral 234, control is transferred to reference numeral 236 of FIG. 5D.

The token bucket works as follows. At reference numeral 232 a byte count denoted "BYTECOUNT 1" is read from the data store associated with the L3 table or the aggregate table. "BYTECOUNT 2" is set to BYTECOUNT I+MAX (MINBYTES, PKTBYTES), that is to say that the byte counter is set to be incremented by the larger of the number of bytes in the present packet or some minimum number of bytes which will be attributed to small packets. This is done to take into account the fact that small packets have a larger real overhead to the communications network than their respective byte counts would tend to indicate, thus they are treated as if they have an artificially larger number of bytes. This process is optional. "BYTECOUNT 3" is set to the original value of BYTECOUNT 1 to hold it for future use detailed below.

Once the byte count is determined at reference numeral 232, control transfers to reference numeral 238. At reference numeral 238, a determination is made as to whether the minimum time stamp interval has elapsed since the last packet was processed which matches the characteristics of the micro flow being processed. If not, then reference numeral 240 is skipped. If the minimum interval has elapsed, then reference numeral 240 decrements BYTECOUNT 2 by the leak rate ("LEAKRATE") multiplied by the elapsed time (# INTERVALS). Hence that value is the leak rate per unit interval multiplied by the number of intervals elapsed based upon the last seen timestamp and current time stamp values. The last seen time stamp is preferably stored in the pertinent table with the pertinent micro flow information. After reference numeral 240, control passes to node D, 242 and then to reference numeral 244 of FIG. 5C.

Figure 5C:
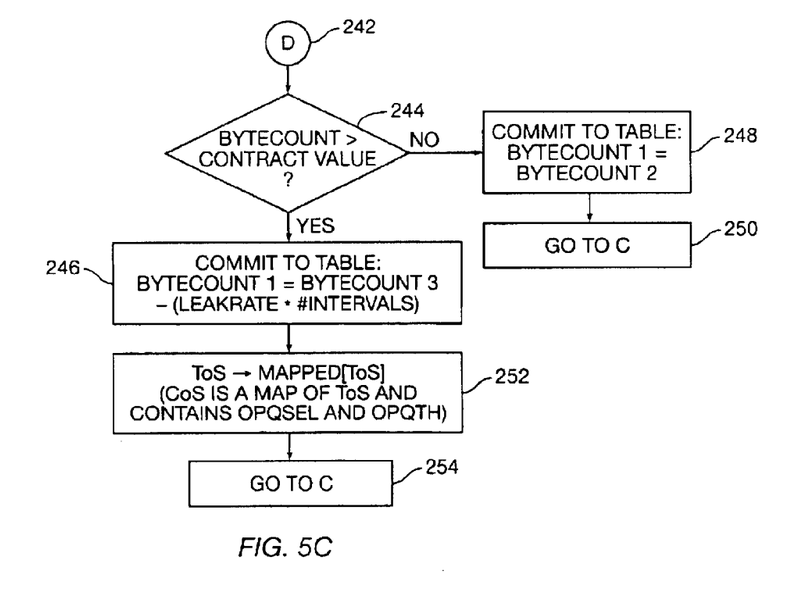

At reference numeral 244 BYTECOUNT 2 is compared to the contract value for the flow read from the appropriate data store. If BYTECOUNT 2 exceeds the contract value then the packet is out of profile and control passes to reference numeral 246. if not, then the packet is in profile and control passes to reference numeral 248.

At reference numeral 248 BYTECOUNT 1 in the data store associated with the table is updated to the value of BYTECOUNT 2. Control then passes to node C, 236 of FIG. 5D via reference numeral 250. At reference numeral 246, since the packet is out of profile, the BYTECOUNT 1 value in the data store associated with the table is updated for leak rate but is not charged for bytes associated with the packet. Hence, BYTECOUNT 1=BYTECOUNT 3 (LEAK RATE*# INTERVALS). Control then passes to reference numeral 252 where a value for the codepoint (ToS/CoS) is determined. This value will preferably incorporate an output threshold (OPQTH) which increases the likelihood that the packet will be dropped in various congestion situations, as it is out of profile. Control then passes to node C, 236 of FIG. 5D via reference numeral 254.

Figure 5D:
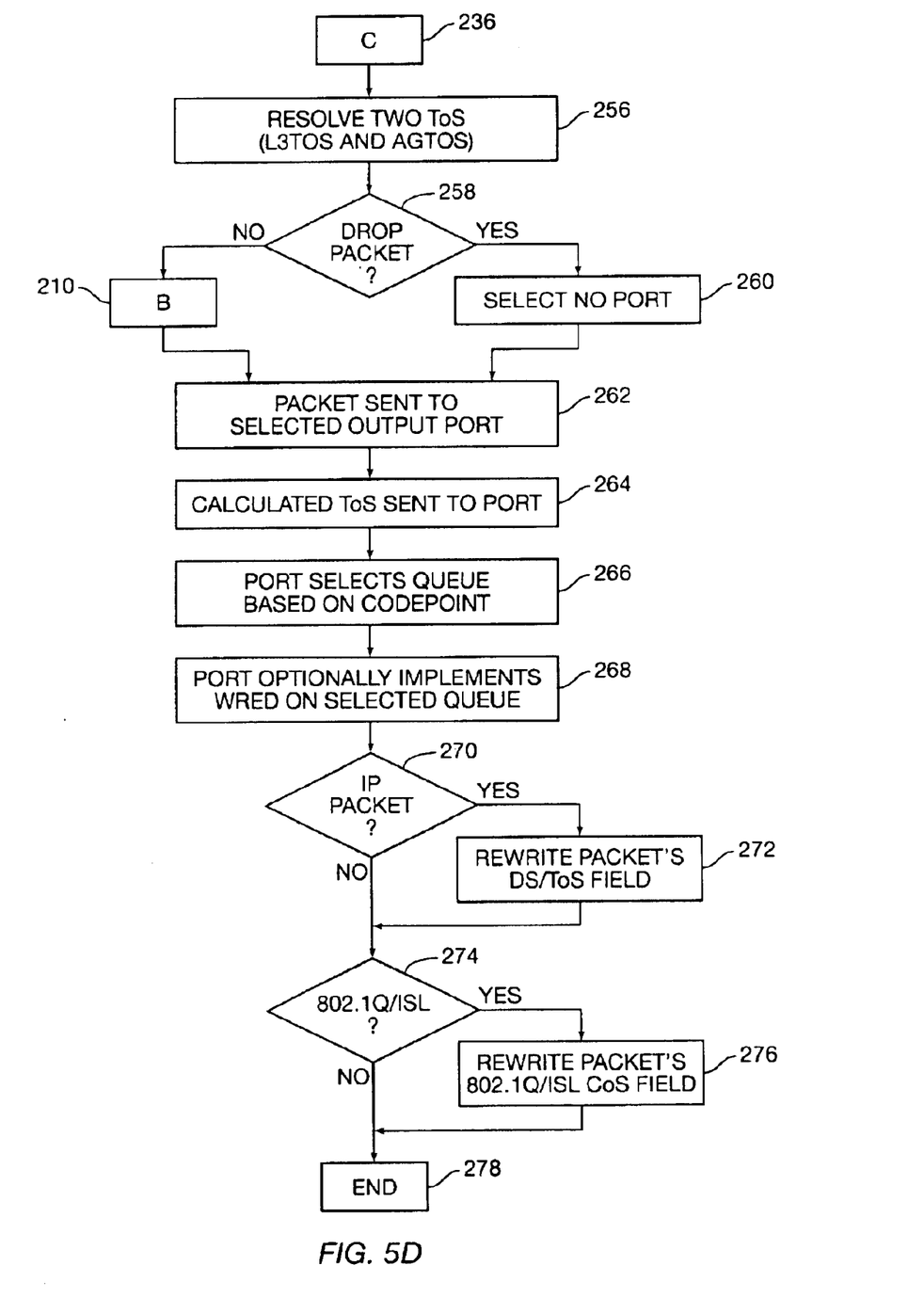

Turning now to FIG. 5D, from reference numeral 236, control passes to reference numeral 256 where the two ToS values (L3 ToS and AG ToS) derived from branch 218 and branch 220, respectively of FIG. 5A, are compared and resolved as discussed above in conjunction with the discussion of FIGS. 4B and 4C. Control is then passed to reference numeral 258 where a drop/no drop decision is made based upon policy, only if BYTECOUNT 2 is greater than the contract value associated with the packet flow. If the decision is made to drop the packet, then it is simply forwarded to no port at reference numeral 260, otherwise control passes to reference numeral 210 and from there to reference numeral 262 where the packet is sent to a selected output port. At reference numeral 264 the final ToS is sent to the output port. At reference numeral 266 the port selects the output queue based upon the ToS/CoS. At reference numeral 268 the port optionally implements WRED on the selected queue. At reference numeral 270 if the packet is an EP packet, then control may be optionally transferred to reference numeral 272 so that the packet's DS/ToS field 26 may be rewritten to incorporate the calculated ToS. At reference numeral 274 if the packet has an 802.1 q tag and CoS field, then control may be optionally transferred to reference numeral 276 so that the packet's 802.1q CoS field 24 may be rewritten to incorporate the calculated CoS. Optionally the CoS field may be incorporated into the packet with ISL encapsulation where it can be used downstream. The process is complete at reference numeral 278.

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A method for implementing a quality of service policy in a data communications network, comprising:

receiving a packet of a certain flow;

extracting certain flow information from the packet;

using the certain flow information as an index into an active flow table containing at least one active flow to look up quality of service parameters applicable to the certain flow, the quality of service parameters including a contract value specifying a committed access rate corresponding to the certain flow, an output queue corresponding to the certain flow, and an output queue threshold co corresponding to the output queue;

using the quality of service parameters to determine a codepoint for the packet, the codepoint having encoded in it the output queue and the corresponding output queue threshold value;

implementing a token bucket algorithm with respect to the certain flow using the contract value and a leak rate to determine whether the packet is in-profile or out-of-profile; and when the packet is out-of-profile; modifying the codepoint for the packet and determining whether the packet is to be drooped; and when the packet is in-profile or when the determination has been made that the packet that is out-of-profile is not to be drooped: directing the packet to the output queue based on the codepoint and setting the output queue threshold of the output queue based on the codepoint.

2. The method as defined in claim 1, wherein the active flow table contains Layer 3 flow information.

3. The method as defined in claim 1, wherein the active flow table contains Layer 2 flow information.

4. The method as defined in claim 1, wherein the active flow table contains Layer 4 flow information.

5. The method as defined in claim 1, further comprising: modifying the active flow table to include an entry for the certain flow if the active flow table does not already include an entry for the certain low.

6. The method as defined in claim 1, further comprising: using a Ternary Content Addressable Memory to store the active flow table.

7. The method as defined in claim 1, further comprising: dropping no packets from the certain flow at the output queue while an average queue depth of the output queue of packets belonging to the certain flow is below the output queue threshold.

8. The method as defined in claim 1, further comprising: dropping at least some packets from the certain flow at the output queue while an average queue depth of the output queue of packets belonging to the certain flow is in excess of the output queue threshold.

9. The method as defined in claim 8, wherein the dropping is performed using a Weighted Random Early Detection algorithm.

10. The method as defined in claim 1, further comprising: when the packet is an IP type packet, modifying the packet by changing a Type of Service field of the packet.

11. The method as defined in claim 1, further comprising: when the packet is an 802.1q or an ISL type packet, modifying the packet by changing a Class of Service field of the packet.

12. An apparatus for implementing a quality of service policy data communications network, the apparatus comprising:
a packet input for receiving a packet of a certain flow;
a flow information extractor for extracting certain flow information from the packet;
an active flow table storing for at least one active flow corresponding quality of service parameters specifying at least a contract value specifying a committed access rate, a n output queue, and an output queue threshold value corresponding to the output queue;
a codepoint generator responsive to the flow information extractor and the quality of service parameters, the codepoint generator encoding an output queue and a corresponding output queue threshold value into a codepoint for the packet;
a token bucket using the contract value and a leak rate to determine whether the packet is in-profile or out-of-profile;
a packet codepoint modifier for, when the packet is out-of-profile, modifying the codepoint for the packet;
a packet drooper for, when the packet is out-of-profile, determining whether the packet is to be dropped;
a plurality of output queues, wherein, when the packet is in-profile or when the determination has been made that the packet that is out-of-profile is not to be dropped, one of the plurality of output queues is selected based on the codepoint as the output queue for transmission of the packet; and an output queue threshold setter, wherein, when the packet is in-profile or when the determination has been made that the packet that is out-of-profile is not to be dropped, the output queue threshold for the output queue is set based on the codepoint.

13. The apparatus as defined in claim 12, wherein the active flow table contains Layer 3 flow information.

14. The apparatus as defined in claim 12, wherein the active flow table contains Layer 2 flow information.

15. The apparatus as defined in claim 12, wherein the active flow table contains Layer 4 flow information.

16. The apparatus as defined in claim 12, wherein the active flow table is stored in a Ternary Content Addressable Memory.

17. The apparatus as defined in claim 12, wherein the active flow table is modified to include flows corresponding to packets received which do not have corresponding flow entries in the active flow table.

18. The apparatus as defined in claim 12, wherein no packets of the certain flow are dropped at the selected output queue while the average depth of the selected output queue for the certain flow is below the output queue threshold value corresponding to the selected output queue and the certain flow.

19. The apparatus as defined in claim 12, wherein at least some packets of the certain flow are dropped at the selected output queue while the average depth of the selected output queue for the certain flow is in excess of the output queue threshold value corresponding to the selected output queue and the certain flow.

20. The apparatus as defined in claim 19, wherein a Weighted Random Early Detection algorithm is employed to drop the at least some packets.

21. The apparatus as defined in claim 12, further comprising:
packet modifier for, when the packet is an IP type packet, modifying the packet by changing a Type of Service field of the packet.

22. The apparatus as defined in claim 12, further comprising:
a packet modifier for, when the packet is an 802.1 q or an ISL type packet, modify the packet by changing a Class of Service field of the packet.

23. An apparatus for implementing a quality of service policy in a data communications network, comprising:
means for receiving a packet of a certain flow;
means for extracting certain flow information from the packet;
means for using the certain flow information as an index into an active flow table containing at least one active flow to look up quality of service parameters applicable to the certain flow, the quality of service parameters including a contract value specifying a committed access rate corresponding to the certain flow, an output queue corresponding to the certain flow, and an output queue threshold corresponding to the output queue;
means for using the quality of service parameters to determine a codepoint for the packet, the codepoint having encoded in it the output queue and the corresponding output queue threshold value;
means for implementing a token bucket algorithm with respect to the certain flow using the contract value and a leak rate to determine whether the packet is in-profile or out-of-profile;
when the packet is out-of-profile: means for modifying the codepoint for the packet and determining whether the packet is to be dropped; and when the packet is in-profile or when the determination has been made that the packet that is out-of-profile is not to be dropped: means for directing the packet to the output queue based on the codepoint and setting the output queue threshold of the output queue based on the codepoint.

24. The apparatus as defined in claim 23, wherein the active flow table contains Layer 3 flow information.

25. The apparatus as defined in claim 23, wherein the active flow table contains Layer 2 flow information.

26. The apparatus as defined in claim 23, wherein the active flow table contains Layer 4 flow information.

27. The apparatus as defined in claim 23, ether comprising:

means for modifying the active flow table to include an entry for the certain flow if the active flow table does not already include an entry for the certain flow.

28. The apparatus as defined in claim 23, further comprising:

using a Ternary Content Addressable Memory to store the active flow table.

29. The apparatus as defined in claim 23, further comprising:

means for dropping no packets from the certain flow at the output queue while an average queue depth of the output queue of packets belonging to the certain flow is below the output queue threshold.

30. The apparatus as defined in claim 23, further comprising:

means for dropping at least some packets from the certain flow at the output queue while an average queue depth of the output queue of packets belonging to the certain flow is in excess of the output queue threshold.

31. The apparatus as defined in claim 30, wherein the dropping is performed using a Weighted Random Early Detection algorithm.

32. The apparatus as defined in claim 23, further comprising:

when the packet is an IP type packet means for modifying the packet by changing a Type of Service field of the packet.

33. The apparatus as defined in claim 23, further comprising:

when the packet is an 802.1q or an ISL type packet, means for modifying the packet by changing a Class of Service field of the packet.

* * * * *

UNITED STATES PATENT AND TRADEMARK OFFICE
CERTIFICATE OF CORRECTION

| | |
|---|---|
| PATENT NO. | : 6,868,065 B1 |
| APPLICATION NO. | : 10/391683 |
| DATED | : March 15, 2005 |
| INVENTOR(S) | : Kloth et al. |

It is certified that error appears in the above-identified patent and that said Letters Patent is hereby corrected as shown below:

1) In column 1 line 42 after The meaning of the bits in block 18 and, delete "to".

2) In column 1 line 44, replace "togas" with --to as--.

3) In column 3 line 65 before packet, replace "EP" with --IP--.

4) In column 5 line 9 after 256, replace "(2S)" with --(2.sup.8)--.

5) In column 8 line 51 after {1,0} and, replace "{1,0}" with --{1,1}--.

6) In column 12 line 3 replace "COSF" with --CoS.sub.F--.

7) In column 12 line 4 replace "COSF" with --CoS.sub.F--.

8) In column 13 line 21 after is set to BYTECOUNT, replace "l" with --1--.

9) In column 14 line 21 after 270 if the packet is an, replace "EP" with --IP--.

10) In column 14 line 52 claim 1 after threshold, delete "co".

11) In column 14 line 60 claim 1 after profile;, delete "and".

12) In column 14 line 64 claim 1, replace "drooped" with --dropped--.

13) In column 14 line 67 claim 1, replace "drooped." with --dropped.--.

14) In column 15 line 13 claim 5 after include an entry for the certain, replace "low." with --flow.--.

15) In column 15 line 39 claim 12 between policy and data, insert --in a--.

16) In column 15 line 47 claim 12 after rate, replace "a n" with --an--.

17) In column 15 line 60 claim 12 after a packet, replace "drooper" with --dropper--.

18) In column 16 line 35 claim 21 before packet modifier, insert --a--.

UNITED STATES PATENT AND TRADEMARK OFFICE
CERTIFICATE OF CORRECTION

PATENT NO. : 6,868,065 B1
APPLICATION NO. : 10/391683
DATED : March 15, 2005
INVENTOR(S) : Kloth et al.

It is certified that error appears in the above-identified patent and that said Letters Patent is hereby corrected as shown below:

19) In column 16 line 41 claim 22 after ISL type packet, replace "modify" with --modifying--.

20) In column 17 line 13 claim 27, replace "ether" with --further--.

Signed and Sealed this

Twenty-ninth Day of January, 2008

JON W. DUDAS
*Director of the United States Patent and Trademark Office*